(12) United States Patent
Iwasa

(10) Patent No.: US 7,558,702 B2
(45) Date of Patent: Jul. 7, 2009

(54) COMPUTER APPARATUS, START-UP CONTROLLING METHOD, AND STORAGE MEDIUM

(75) Inventor: Naoki Iwasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/424,893

(22) Filed: Jun. 19, 2006

(65) Prior Publication Data

US 2007/0219748 A1      Sep. 20, 2007

(30) Foreign Application Priority Data

Mar. 17, 2006    (JP)    ............... 2006-074369

(51) Int. Cl.
*G06F 11/30* (2006.01)
(52) U.S. Cl. ........................................ 702/183; 714/48
(58) Field of Classification Search ............. 702/57–58, 702/79–80, 117, 120, 182–183, 185–186; 714/25, 48–49, 53–57, 814–815
See application file for complete search history.

(56) References Cited

U.S. PATENT DOCUMENTS 6,496,945 B2 * 12/2002 Cepulis et al. ................ 714/25

7,024,700 B1 * 4/2006 Horikoshi et al. ............. 726/34
2004/0111599 A1 * 6/2004 Jordan et al. .................. 713/2
2007/0050577 A1 * 3/2007 Kimura et al. ............. 711/162

FOREIGN PATENT DOCUMENTS

| JP | 06-266573 | 9/1994 |
|---|---|---|
| JP | 2002-215399 | 8/2002 |
| JP | 2005-196261 | 7/2005 |

* cited by examiner

*Primary Examiner*—Eliseo Ramos Feliciano
*Assistant Examiner*—Mary C Baran
(74) *Attorney, Agent, or Firm*—Staas & Halsey LLP

(57) ABSTRACT

The present invention relates to start-up control of a computer apparatus connected with an external device such as a USB device and is intended to easily avoid abnormalities such as a start-up failure. Identification and connectivity of an external device is monitored at the time of start-up in a computer apparatus connected with an external device such as a USB device, and if the external device is recognized as a failure device, device information of the external device is captured and an abnormality such as a start-up failure is avoided by excluding the failure device at the time of the next start-up.

14 Claims, 6 Drawing Sheets

COMPUTER APPARATUS, START-UP CONTROLLING METHOD, AND STORAGE MEDIUM

CROSS-REFERENCE TO RELATED APPLICATIONS

This application is based upon and claims the benefit of priority from the prior Japanese Patent Application No. 2006-74369, filed on Mar. 17, 2006, the entire contents of which are incorporated herein by reference.

BACKGROUND OF THE INVENTION

1. Field of the Invention

The present invention relates generally to start-up control of a computer apparatus such as a personal computer connected with an external device such as a USB (Universal Serial Bus) device, and more particularly, to a computer apparatus, a start-up controlling method, and a start-up controlling program that monitor a start-up failure of BIOS (Basic Input Output System), etc. to avoid an abnormality of start-up, and to a computer readable storage medium having embodied therein the start-up controlling program.

2. Description of the Related Art

A personal computer is connected with external devices such as USB devices to realize various functions. If it is recognized that a start-up failure occurs due to a connected USB device at the time of start-up, the connected USB device is removed once and, after OS (operating system) is started in the computer, the USB device to be used is connected again.

With regard to a countermeasure to such a start-up failure, a prior art includes Japanese Patent Application Laid-Open Publication No. 1994-266573; in a system disclosed there, an end code and a preceding end code are read from a non-volatile memory in the case of a restart process; when the possibility information of the end code instructs restarting, the two end codes are compared; and when failures are identical and the recording date and time thereof is not the same, the latest end code is updated to the preceding end code to restart the service of OS (paragraph Nos. 0022, 0029 to 0039, FIGS. 3 and 4, etc.). In a system disclosed in Japanese Patent Application Laid-Open Publication No. 2002-215399, a priority is determined for a plurality of storage apparatuses storing OS; the storage apparatuses are investigated in the order of the priority; and the OS stored in the storage device with the highest priority is started among the normal storage apparatuses (paragraph Nos. 0013, 0014, FIGS. 1 and 2, etc.). In an information processing apparatus disclosed in Japanese Patent Application Laid-Open Publication No. 2005-196261, device model information is acquired which indicates a model of a process target device; device control information is generated from the acquired device model information; and the device control information is used for the management information.

Although countermeasures can be taken with the use of BIOS when abnormalities such as start-up failures are found in connection tests of various USB devices performed at the time of product shipment, compliance with the USB device will be revealed later in a new product that has been shipped. In such a case, a countermeasure may be taken for the USB device with problems by updating the BIOS, for example.

If an abnormality is generated when starting a computer apparatus connected with an external device, the cause of the abnormality is difficult to be known and a user will attempt to restart first. If the same start-up failure occurs when restarting, it is difficult to take measures and, normally, the next operation cannot be initiated.

In a countermeasure for a start-up failure generated when an arbitrary USB device is connected, if the abnormality is generated even when the USB device is removed once for restart, update of BIOS may be needed after attempting to avoid the problem with the BIOS.

Japanese Patent Application Laid-Open Publication Nos. 1994-266573, 2002-215399, and 2005-196261 do not indicate or disclose such problems and do not indicate or describe means for solving the problems.

SUMMARY OF THE INVENTION

The present invention relates to start-up control of a computer apparatus connected with an external device such as a USB device and it is an object of the present invention to easily avoid abnormalities such as a start-up failure.

To achieve the above object, in the present invention, identification and connectivity of an external device is monitored at the time of start-up in a computer apparatus connected with an external device such as a USB device, and if the external device is recognized as a failure device, device information of the external device is captured and an abnormality such as a start-up failure is avoided by excluding the failure device at the time of the next start-up. The above object is achieved by such as configuration.

Thus, according to a first aspect of the present invention there is provided a computer apparatus that is connected with an external device, the computer apparatus analyzing the function of the external device at the time of start-up to enable the use of the external device, the computer apparatus comprising an abnormality detecting unit that detects a start-up abnormality due to the external device; and a notifying unit that performs a notification of the start-up abnormality in case where the abnormality detecting unit detects the start-up abnormality.

In such a configuration, the abnormality detecting unit detects the start-up abnormality due to the external device and notifies the notifying unit of the detection output. When the abnormality detecting unit detects the start-up abnormality, the notifying unit notifies of the start-up abnormality. A user can learn the start-up abnormality from the notification.

Preferably, in the computer apparatus, the abnormality detecting unit may generate an output representing the start-up abnormality if normal operation cannot be achieved in a predetermined time.

Preferably, the computer apparatus comprises a storing unit that stores device information representing the external device as an abnormal device if the abnormality detecting unit detects the start-up abnormality not achieving normal operation in a predetermined time; and a device selecting unit that compares device information of the external device with the device information in the storing unit at the time of start-up, the device selecting unit excluding the external device from targets of use if the device information is identical.

Preferably, the computer apparatus comprises an input detecting unit that detects operational input, in case where the start-up abnormality is detected by the abnormality detecting unit and the notification of the start-up abnormality is performed by the notifying unit; a storing unit that stores device information representing the external device as an abnormal device in case where the input detecting unit detects the operational input; and a device selecting unit that compares device information of the external device with the device information in the storing unit at the time of start-up, the device selecting unit excluding the external device from targets of use if the device information is identical.

Preferably, in the computer apparatus, the external device is a USB (Universal Serial Bus) device.

Preferably, in the computer apparatus, the storing unit is a nonvolatile memory.

In order to achieve the above object, according to a second aspect of the present invention there is provided a start-up controlling method of a computer apparatus that is connected with an external device, the computer apparatus analyzing the function of the external device at the time of start-up to enable the use of the external device, the start-up controlling method comprising the steps of detecting a start-up abnormality due to the external device at the time of the start-up of the computer apparatus; and performing a notification of the start-up abnormality in case where the start-up abnormality is detected.

Preferably, the start-up controlling method of the computer apparatus comprises the step of detecting the start-up abnormality if normal operation cannot be achieved in a predetermined time.

Preferably, the start-up controlling method of the computer apparatus comprises the steps of storing into a storing unit device information representing the external device as an abnormal device in case where detecting the start-up abnormality not achieving normal operation in a predetermined time; and comparing device information of the external device with the device information in the storing unit at the time of the start-up of the computer apparatus and excluding the external device from targets of use if the device information is identical.

Preferably, the start-up controlling method of the computer apparatus comprises the steps of detecting operational input, in case where the start-up abnormality is detected and the notification of the start-up abnormality is performed; storing into a storing unit device information representing the external device as an abnormal device in case where the operational input is detected; and comparing device information of the external device with the device information in the storing unit at the time of the start-up and excluding the external device from targets of use if the device information is identical.

In order to achieve the above object, according to a third aspect of the present invention there is provided a computer readable storage medium having embodied therein a start-up controlling program of a computer apparatus that is connected with an external device, the computer apparatus analyzing the function of the external device at the time of start-up to enable the use of the external device, the program driving the computer apparatus to execute the steps of detecting a start-up abnormality due to the external device at the time of the start-up of the computer apparatus; and performing a notification of the start-up abnormality in case where the start-up abnormality is detected.

Preferably, the start-up controlling program of the computer apparatus drives the computer apparatus to execute the step of detecting the start-up abnormality if normal operation cannot be achieved in a predetermined time.

Preferably, the start-up controlling program of the computer apparatus drives the computer apparatus to execute the steps of storing into a storing unit device information representing the external device as an abnormal device in case where the abnormality detecting unit detects the start-up abnormality not achieving normal operation in a predetermined time; and comparing device information of the external device with the device information in the storing unit at the time of the start-up of the computer apparatus and excluding the external device from targets of use if the device information is identical.

Preferably, the start-up controlling program of the computer apparatus drives the computer apparatus to execute the steps of detecting operational input, in case where the start-up abnormality is detected by the abnormality detecting unit and the notification of the start-up abnormality is performed by the notifying unit; storing into a storing unit device information representing the external device as an abnormal device in case where the operational input is detected by the input detecting unit; and comparing device information of the external device with the device information in the storing unit at the time of the start-up and excluding the external device from targets of use if the device information is identical.

In order to achieve the above object, according to the present invention there is provided a computer apparatus that is connected with an external device, the computer apparatus analyzing the function of the external device at the time of start-up to enable the use of the external device, the computer apparatus comprising an abnormality detecting unit that detects a start-up abnormality due to the external device; a storing unit that stores device information representing the external device as an abnormal device if the abnormality detecting unit detects the start-up abnormality not achieving normal operation in a predetermined time; and a device selecting unit that compares device information of the external device with the device information in the storing unit at the time of start-up, the device selecting unit excluding the external device from targets of use if the device information is identical.

In order to achieve the above object, according to the present invention there is provided a start-up controlling method of a computer apparatus that is connected with an external device, the computer apparatus analyzing the function of the external device at the time of start-up to enable the use of the external device, the start-up controlling method comprising the steps of detecting a start-up abnormality due to the external device at the time of the start-up of the computer apparatus; storing into a storing unit device information representing the external device as an abnormal device in case where detecting the start-up abnormality not achieving normal operation in a predetermined time; and comparing device information of the external device with the device information in the storing unit at the time of the start-up of the computer apparatus and excluding the external device from targets of use if the device information is identical.

In order to achieve the above object, according to the present invention there is provided a computer readable storage medium having embodied therein a start-up controlling program of a computer apparatus that is connected with an external device, the computer apparatus analyzing the function of the external device at the time of start-up to enable the use of the external device, the program driving the computer apparatus to execute the steps of detecting a start-up abnormality due to the external device at the time of the start-up of the computer apparatus; storing into a storing unit device information representing the external device as an abnormal device in case where detecting the start-up abnormality not achieving normal operation in a predetermined time; and comparing device information of the external device with the device information in the storing unit at the time of the start-up of the computer apparatus and excluding the external device from targets of use if the device information is identical.

The features and advantages of the present invention are listed as follows.

(1) An abnormality such as a start-up failure is detected for notification when the start-up is performed with an external device connected, a user can easily avoid the abnormality due to the external device.

(2) When an abnormality such as a start-up failure is detected, start-up can be performed by excluding an abnormal device from targets of use at the restart and the abnormal state can be easily avoided.

BRIEF DESCRIPTION OF THE DRAWINGS

The above and other objects, features, and advantages of the present invention will become more apparent from the following detailed description of the preferred embodiments with reference to the accompanying drawings, in which.

DESCRIPTION OF THE PREFERRED EMBODIMENTS

First Embodiment

Figure 1:
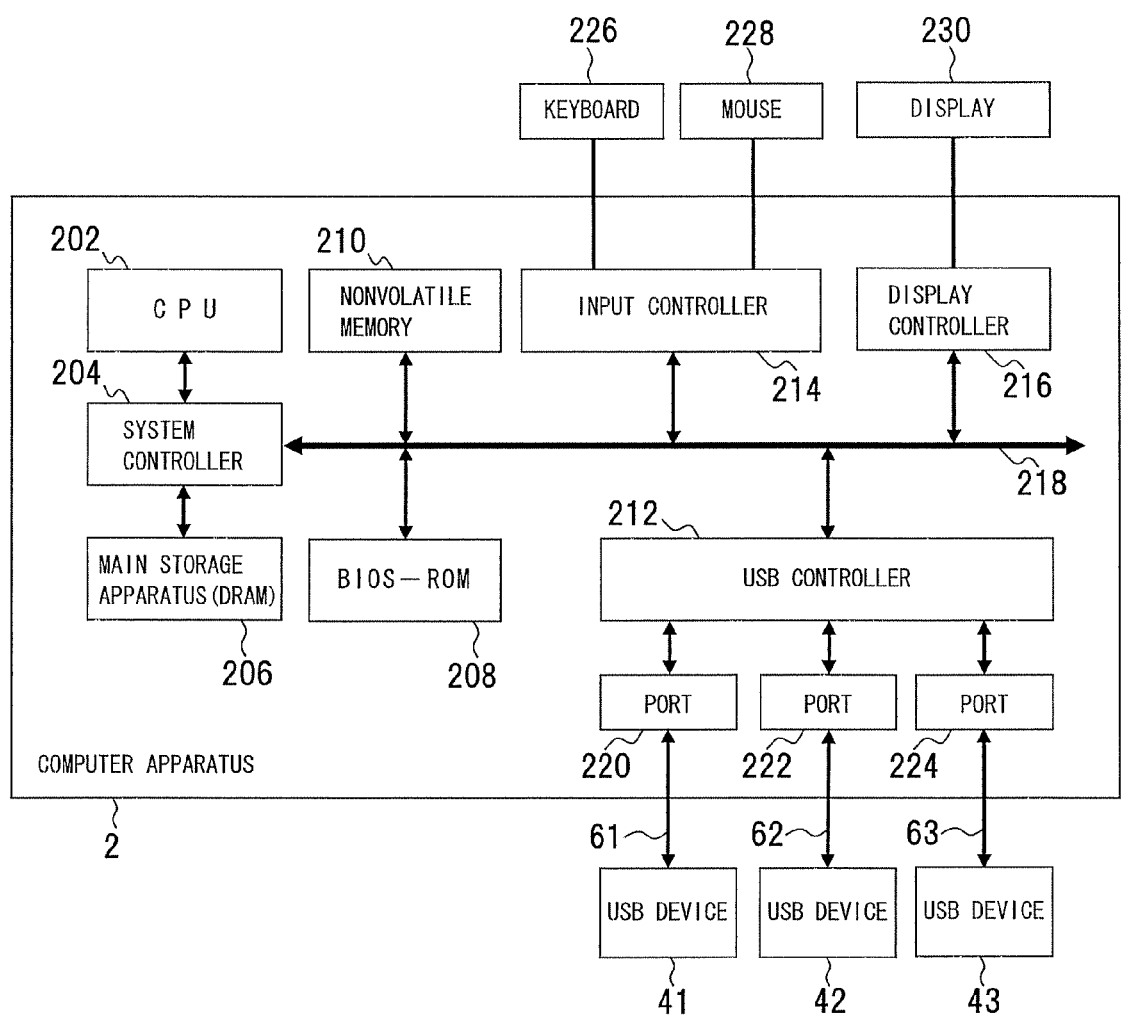
FIG. 1 is a block diagram of a computer apparatus and connection of a USB device, according to a first embodiment.

A first embodiment of the present invention will be described with reference to FIG. 1. FIG. 1 shows an example of a computer apparatus connected with an external device.

This computer apparatus 2 is, for example, a personal computer and is connected with one or more external devices, i.e., USB devices 41, 42, 43 through USB cables 61, 62, 63 to constitute a computer system. The external devices are devices externally connected with the computer apparatus 2 with the use of connecting means such as the USB cables 61, 62, 63, and the USB devices 41, 42, 43 are, for example, keyboards, mice, storage devices, cameras, DVD (Digital Versatile Disc) apparatuses, storage disk drives, etc. The USB devices 41 to 43 are functional devices connected to the computer apparatus 2 through the USB cables 61 to 63 to act as external apparatuses of the computer apparatus 2.

The computer apparatus 2 includes functioning units such as a CPU (Central Processing Unit) 202, a system controller 204, a main storage apparatus 206, a BIOS-ROM (Read-Only Memory) 208, a nonvolatile memory 210, a USB controller 212, an input controller 214 that is an input detecting unit, and a display controller 216, and these functioning units are connected by a bus 218.

The CPU 202 is connected to the main storage apparatus 206, the BIOS-ROM 208, etc. via the system controller 204 and executes BIOS in the BIOS-ROM 208 at the time of start-up or executes OS and application programs in the main storage apparatus 206 under the control of the system controller 204. Based on start-up of the BIOS, the CPU 202 captures identification information and functional information, i.e., device information of the USB devices 41 to 43 being connected at the time of start-up to detect an abnormality and, therefore, constitutes an abnormality detecting unit. The system controller 204 controls execution of the BIOS, OS, etc. executed by the CPU 202 and controls restart, etc.

The main storage apparatus 206 is constituted by a storage medium such as DRAM (Dynamic Random-Access Memory), and stores OS and application programs. The BIOS-ROM 208 stores BIOS (Basic Input Output System) and the BIOS is a program for a basic process necessary for interfacing input/output apparatuses and is an aggregate of device drivers for input/output control. The BIOS is operated concurrently with the start-up of the computer apparatus 2 and includes functions for recognizing hardware of the functioning units, detecting whether the normal operation can be achieved or not, and handing over the process to the OS if the normal operation can be achieved.

The nonvolatile memory 210 is used under the control of the CPU 202 for storing the identification information and the functional information, i.e., the device information acquired from the USB devices 41 to 43.

The USB controller 212 includes a plurality of input ports, for example, ports 220, 222, 224 and is connected to the USB device 41, the USB device 42, and the USB device 43 through the port 220, the port 222, and the port 224, respectively. The USB controller 212 constitutes a device selecting unit cooperating with the CPU 202 and includes a function for disconnecting an abnormal device, for example, among the USB devices 41 to 43 under the control of the CPU 202.

The input controller 214 connects input apparatuses or the aforementioned input detecting units, for example, a keyboard 226 and a mouse 228 to the CPU 202 through the bus 218 and accepts the operational inputs of the keyboard 226 and the mouse 228 under the control of the CPU 202. The keyboard 226 is a user interface and an apparatus for directly inputting symbols, etc. into the CPU 202 with human hands. The keyboard 226 includes a plurality of keys such as symbol keys, cursor keys, and enter key. The mouse 228 is an input apparatus for inputting information by converting motion to electric signals.

The display controller 216 is connected with a notifying unit for notification of abnormalities, which is, for example, a display 230 for outputting display output of a process result and information in the middle of processing. The display 230 is an image display apparatus and displays the display output in a visible manner.

Figure 2:
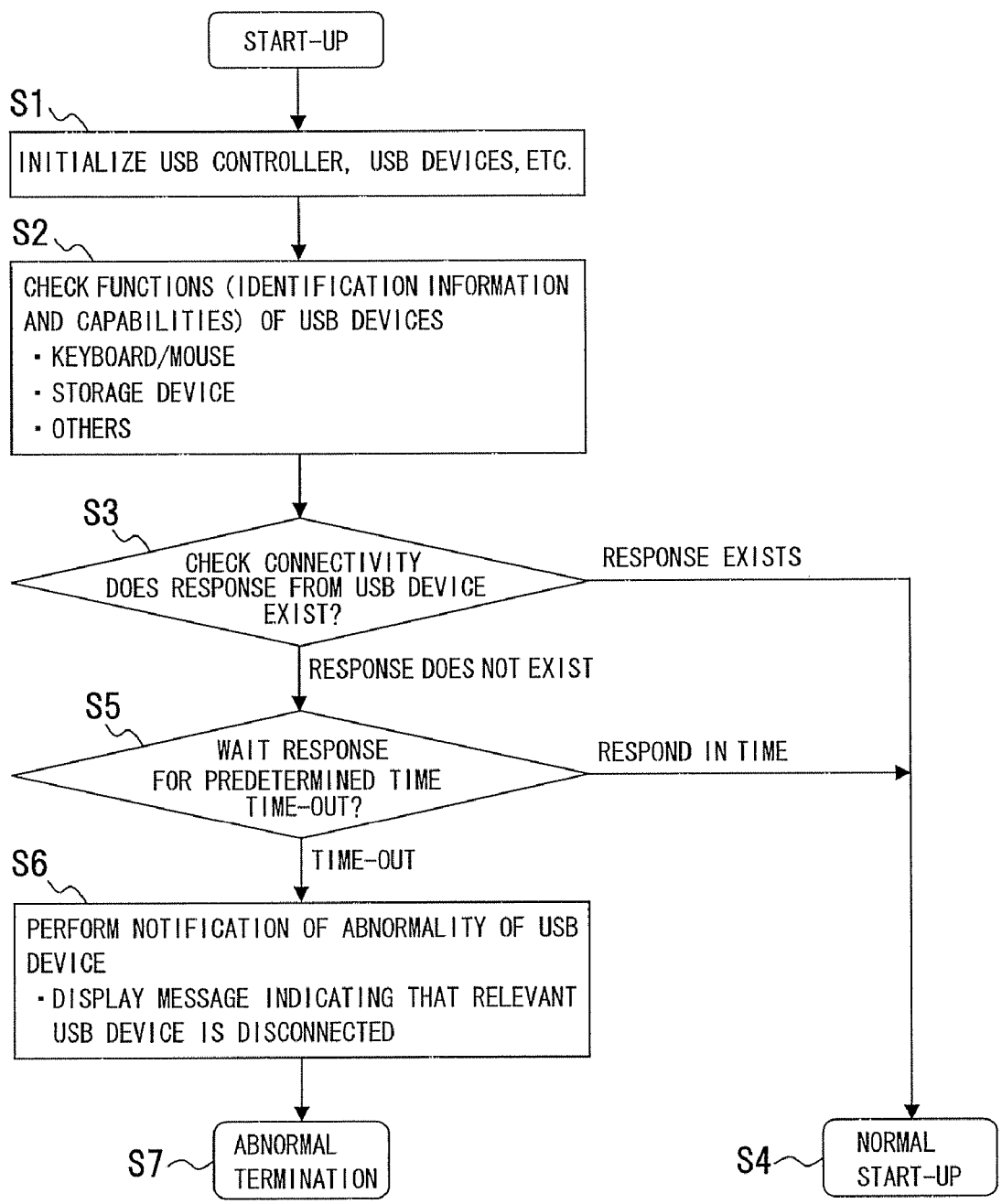
FIG. 2 is a flowchart of a process procedure of start-up control according to the first embodiment.
Figure 3:
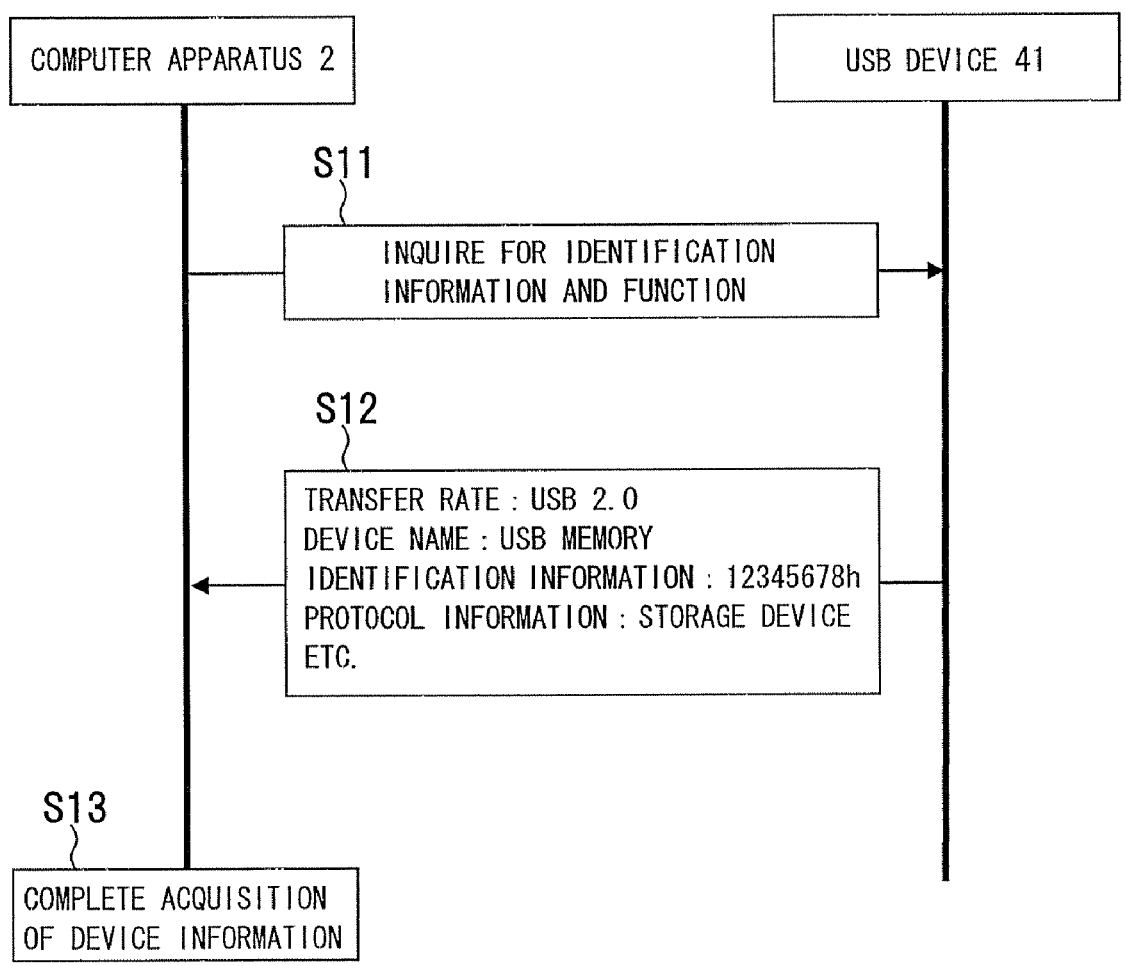
FIG. 3 is a sequence diagram of capturing of device information from the USB device.

The operation at the time of start-up is described with reference to FIGS. 2 and 3. FIG. 2 is a flowchart of a process procedure of start-up control according to the first embodiment and FIG. 3 is a sequence diagram of a process procedure of acquirement of the USB device information.

In this process, start-up statuses of the USB devices 41 to 43 connected to the computer apparatus 2 are monitored by the BIOS stored in the BIOS-ROM 208 of the computer apparatus 2 at the time of start-up to avoid the start-up failure.

The computer apparatus 2 is powered on to perform POST (Power On Self Test), which is a function test at the time of power-on. During this POST process, various devices such as the USB controller 212 and the USB devices 41 to 43 are initialized (step S1) and the functions of the USB devices 41 to 43 are checked (step S2). In this check, each piece of device information representing the USB devices 41 to 43 is acquired to check the functions of the USB devices 41 to 43. The target USB devices 41 to 43 of the function check are, for example, keyboards, mice, storage devices, and other devices.

In this function check, a function check program, for example, the BIOS checks the connectivity representing whether or not the normal operation can be achieved by the connection with the computer apparatus 2 and checks whether the USB devices 41 to 43 respond or not (step S3), and if the USB devices 41 to 43 respond, the normal start-up is performed (step S4). In this case, if the USB devices 41 to 43 does not respond, the response is waited for a predetermined time to determine time-out (step S5); if the response is received in time, the normal start-up is performed (step S4); in the case of time-out, notification of the abnormality of the USB device is performed; a message is displayed on the display 230 to notify that the relevant USB device is disconnected (step S6); and this process is terminated (step S7).

With regard to the response check between the USB devices 41 to 43 and the computer apparatus 2, in the case of the USB device 41 shown in FIG. 3, the computer apparatus 2 inquires the device information of the USB device 41 that is identification information and functional information representing each capability from the USB device 41 (step S11); the USB device 41 notifies the computer apparatus 2 of the device information for this inquiry (step S12); and the acquirement of the device information is completed after this notification (step S13). In this case, the device information of this notification is, for example, a device name, identification information, protocol information, etc., and the functional information of the device information of this notification is, for example, capacity information such as a transfer rate. In this notification about the USB device 41, the USB device 41 is a USB memory; an apparatus number is 12345678h; protocol information is storage device; and a transfer rate is USB 2.0. The notification of the identification information and the functional information of the device information is performed for the USB devices 42, 43 as well.

In this embodiment, when starting up the computer apparatus 2 connected with the USB devices 41 to 43, the computer apparatus 2 inquires the device information of each USB device 41 to 43, checks connectivity, and notifies, as an anomaly notification that the abnormal devices are disconnected if response cannot be acquired from any or all of the USB devices 41 to 43 within predetermined time as a result of the check.

With such a process, the abnormality due to the start-up failure can be avoided; troubles at the time of the start up can be avoided for USB devices that were not subjected to the operation check at the time of shipment of the computer apparatus 2; and such a process is also useful to eliminate troubles quickly.

Particularly, in the countermeasures for the start-up failure in the USB device newly purchased and connected after the shipment of the computer apparatus 2, cumbersome operations can be eliminated such as starting up after once removing the USB device or updating the BIOS after attempting to avoid the problem with the BIOS.

Second Embodiment

Figure 4:
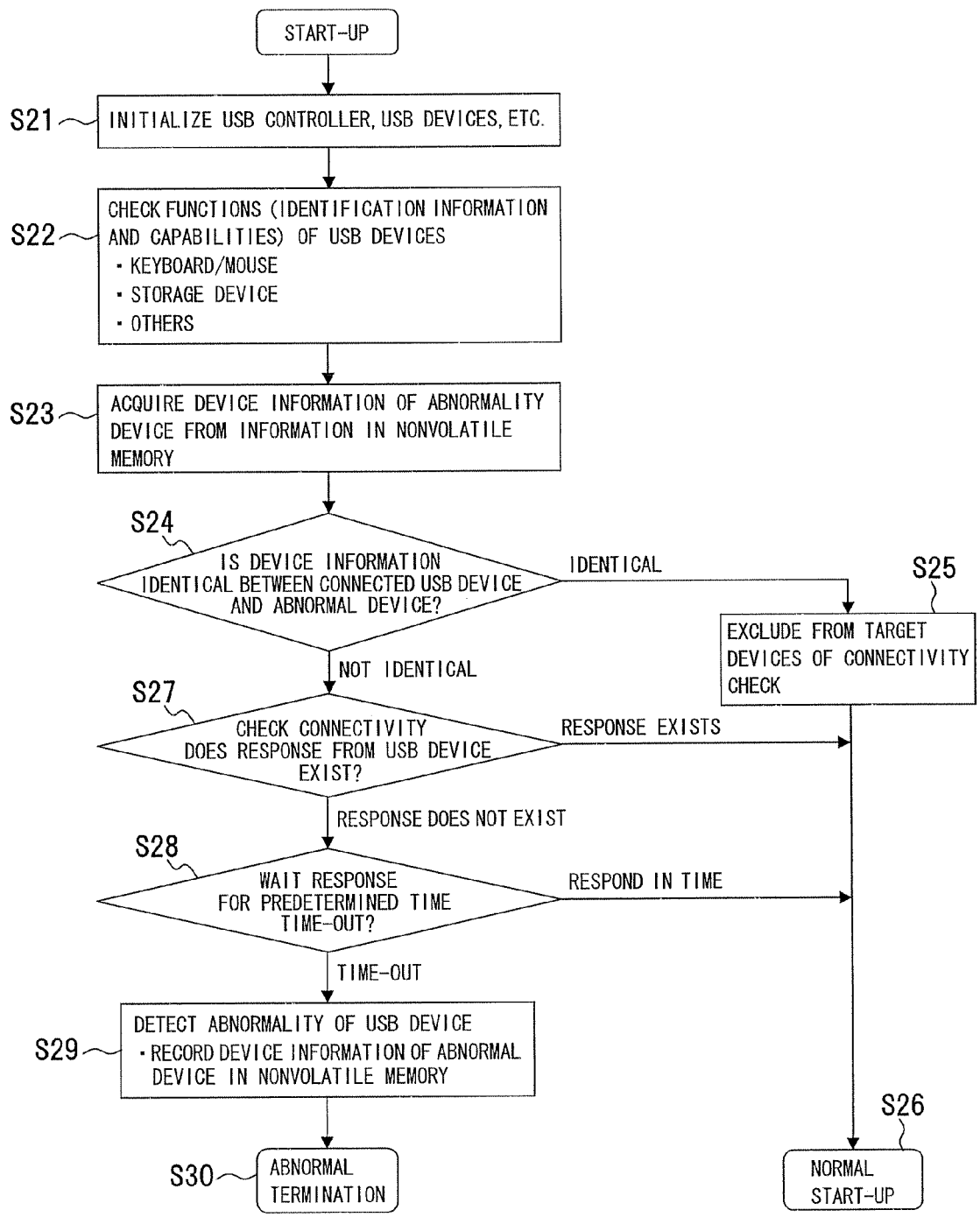
FIG. 4 is a flowchart of a process procedure of start-up control according to a second embodiment.

A second embodiment of the present invention will be described with reference to FIG. 4. FIG. 4 is a flowchart of a process procedure of start-up control according to the second embodiment.

In the second embodiment, after checking the connectivity of the USB devices, a process for recording the device information is performed to identify the abnormal device. In such a process, the computer apparatus 2 shown in FIG. 1 is used for a computer apparatus, i.e., hardware; the flowchart shown in FIG. 2 is used for the capturing process of the identification information and the functional information, i.e., the device information; and the description thereof is omitted.

As is the case with the first embodiment, the computer apparatus 2 is powered on to perform the POST. During this POST process, various devices such as the USB controller 212 and the USB devices 41 to 43 are initialized (step S21) and the functions of the USB devices 41 to 43 are checked (step S22). In this check, the device information of the USB devices 41 to 43 is acquired to check the capabilities of the USB devices 41 to 43. The target USB devices 41 to 43 of the function check are, for example, keyboards, mice, storage devices, and other devices.

In this case, the device information of the abnormal device is acquired from the information in the nonvolatile memory 210 (step S23) and the device information is compared between the connected USB devices 41 to 43 and the abnormal device to determine whether the information is identical or not (step S24). If the information is identical, the device is excluded from the target devices of the connectivity check (step S25) to perform normal start-up (step S26).

If the device information is not identical between the USB devices 41 to 43 and the abnormal device, the connectivity is checked to determine whether the USB devices 41 to 43 respond normally or not (step S27); if the USB devices 41 to 43 respond, the normal start-up is performed (step S26); if the USB device 41 to 43 does not respond, the response is waited for a predetermined time, i.e., a response waiting state is maintained to determine whether the response is made in the predetermined time or not (step S28); if the response is made in the predetermined time, the normal start-up is performed (step S26); if the response is not made in the predetermined time, the abnormality of the USB device is detected because of time-out; the device information of this abnormal device is recorded in the nonvolatile memory 210 (step S29); and the restart is performed (step S30).

With such a process, the abnormality due to the start-up failure can be avoided; troubles at the time of the start up can be avoided for USB devices that were not subjected to the operation check at the time of shipment of the computer apparatus 2; and troubles can be eliminated quickly.

Third Embodiment

Figure 5:
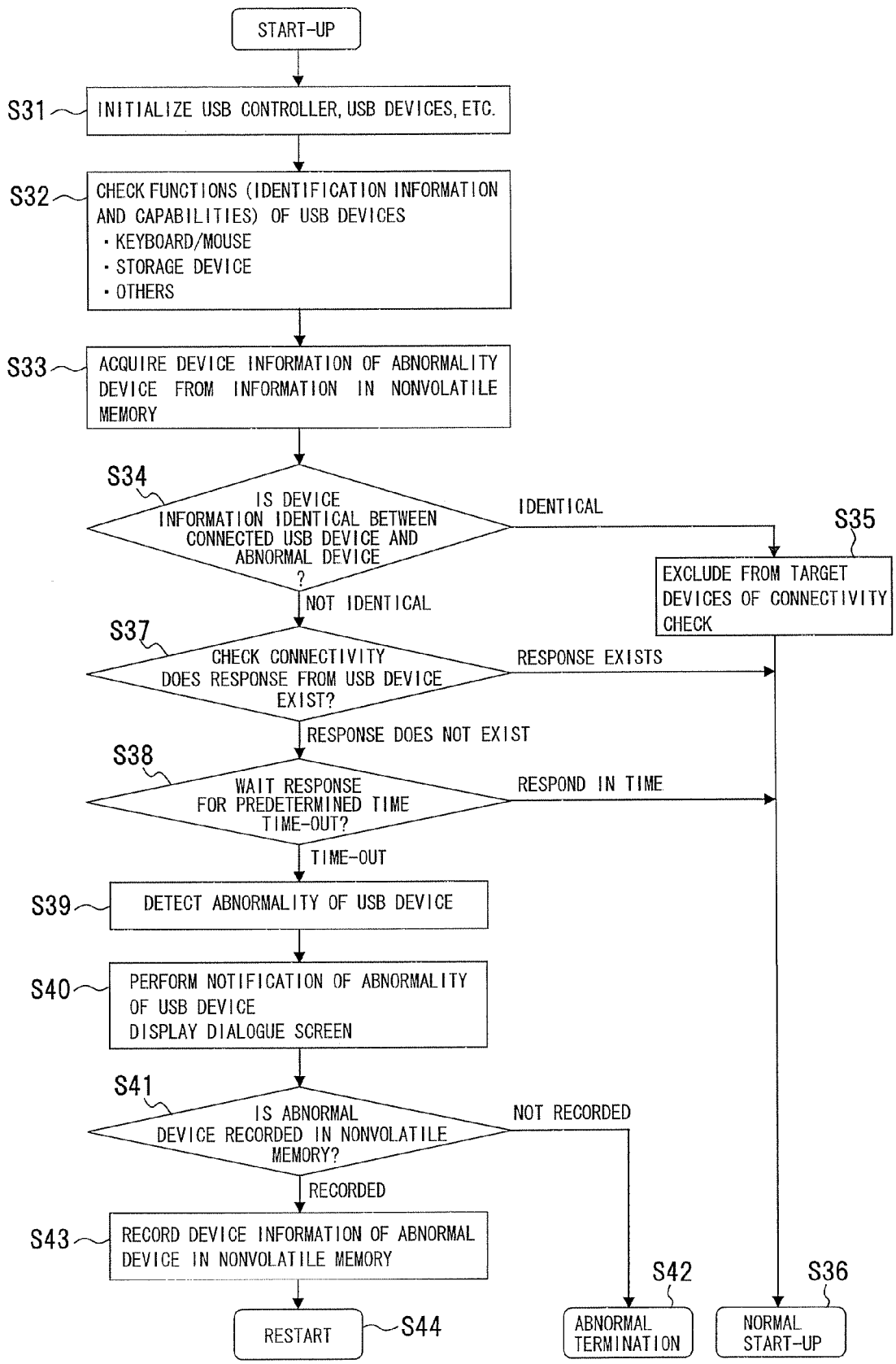
FIG. 5 is a flowchart of a process procedure of start-up control according to a third embodiment.

A third embodiment of the present invention will be described with reference to FIG. 5. FIG. 5 is a flowchart of a process procedure of start-up control according to the third embodiment.

In the third embodiment, after checking the connectivity of the USB devices, a process for recording the device information is performed to identify the abnormal device, and the abnormal device is identified from the device information and is excluded from the targets of the connectivity check. In such a process, the computer apparatus 2 shown in FIG. 1 is used for a computer apparatus, i.e., hardware; the flowchart shown in FIG. 2 is used for the capturing process of the identification information and the functional information, i.e., the device information; and the description thereof is omitted.

As is the case with the first and second embodiments, the computer apparatus 2 is powered on to perform the POST. During this POST process, various devices such as the USB controller 212 and the USB devices 41 to 43 are initialized (step S31) and the functions of the USB devices 41 to 43 are checked (step S32). In this check, the device information of the USB devices 41 to 43 is acquired to check the functions and capabilities of the USB devices 41 to 43. The target USB devices 41 to 43 of the function check are, for example, keyboards, mice, storage devices, and other devices.

In this case, the device information of the abnormal device is acquired from the information in the nonvolatile memory 210 (step S33) and the device information is compared between the connected USB devices 41 to 43 and the abnormal device to determine whether the information is identical or not (step S34). If the information is identical, the device is excluded from the target devices of the connectivity check (step S35) to perform normal start-up (step S36).

If the device information is not identical between the USB devices 41 to 43 and the abnormal device, the connectivity is checked to determine whether the USB devices 41 to 43 respond normally or not (step S37); if the USB devices 41 to 43 respond, the normal start-up is performed (step S36); if the USB device 41 to 43 does not respond, the response is waited for a predetermined time and the response waiting state is maintained to determine whether the response is made in the predetermined time or not (step S38); if the response is made in the predetermined time, the normal start-up is performed (step S36); if the response is not made in the predetermined time, the abnormality of the USB device is detected because of time-out (step S39). Based on the detection of the abnormality, the display 230 is notified of the USB device abnormality and the USB device causing the abnormal state and displays a dialogue screen (step S40). This dialogue screen display shows a message inquiring whether the abnormal device is recorded in the nonvolatile memory 210 or not. It is selected whether the abnormal device is recorded in the nonvolatile memory 210 or not (step S41). This selection may be performed with the input operation of the user to avoid the abnormality, for example, using the keyboard 226, the mouse 228, etc. If the abnormal device is not recorded, the process is terminated abnormally (step S42).

If it is selected to record the abnormal device in the nonvolatile memory 210, the device information of the abnormal device is recorded in the nonvolatile memory 210 (step S43) and the restart is performed (step S44).

With such a process, the abnormality due to the start-up failure can be avoided; troubles at the time of the start up can be avoided for USB devices that were not subjected to the operation check at the time of shipment of the computer apparatus 2; and troubles can be eliminated quickly.

Other Embodiments

Figure 6:
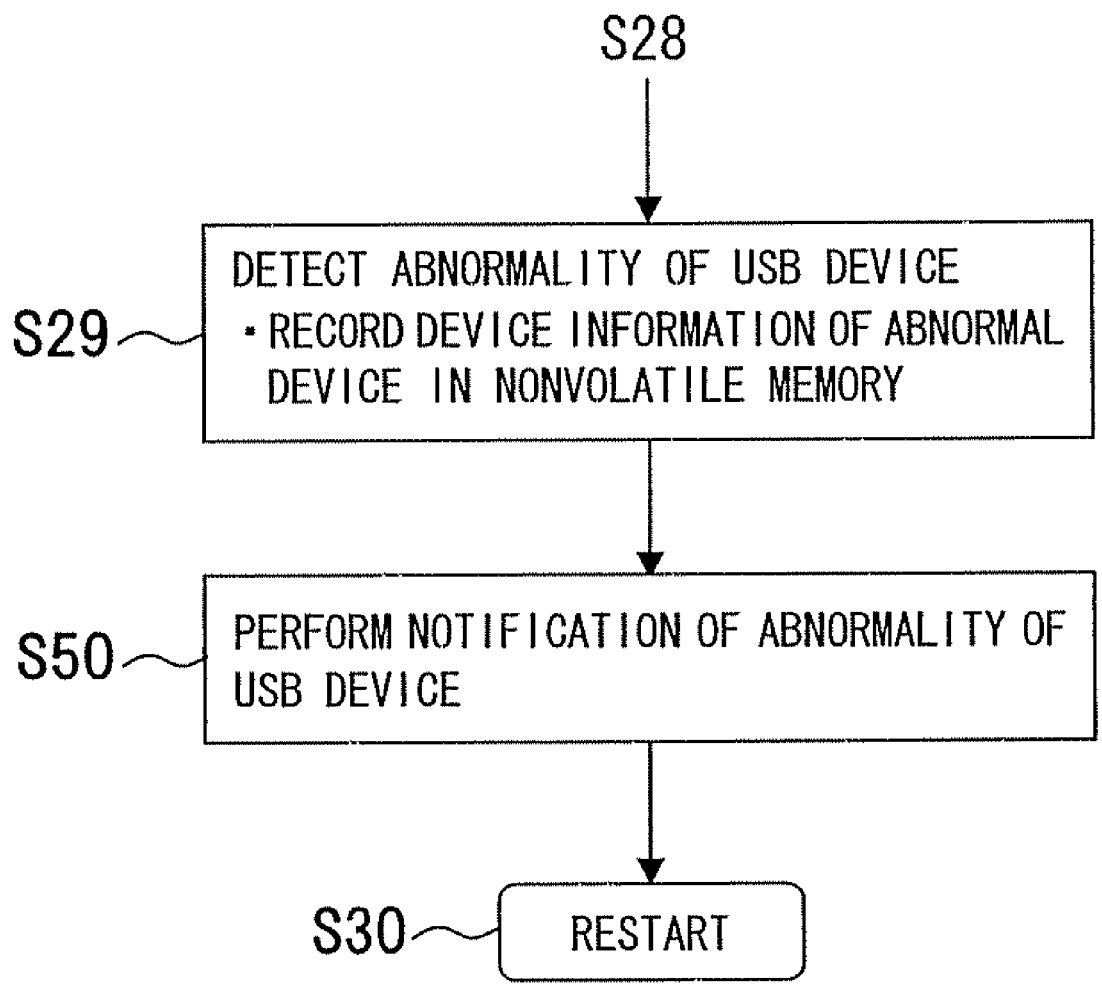
FIG. 6 is a flowchart of a process procedure of start-up control according to another embodiment.

In the second embodiment (FIG. 4), as shown in the flowchart of FIG. 6, after the abnormality of the USB device is detected (step S29), a notification of the abnormality of the USB device may be performed (step S50).

Although it is notified in the above embodiment that the USB device causing the start-up failure is disconnected when the response is not made in the predetermined time, such a notification may not be performed. In this case, as described above, this USB device may be recorded as an abnormal device and excluded from the targets of use at the subsequent start-up.

The invention can usefully control the start-up of the computer apparatus such as a personal computer connected with an external device such as a USB device to monitor the start-up failure of the BIOS and to avoid the start-up abnormality.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A computer apparatus connectable to an external device, the computer apparatus analyzing a function of the external device at a time of start-up to enable use of the external device, the computer apparatus comprising:
   an abnormality detecting unit that detects a start-up abnormality due to the external device;
   a notifying unit that performs a notification of the start-up abnormality when the abnormality detecting unit detects the start-up abnormality;
   a storing unit that stores device information of the external device when the start-up abnormality is detected by the abnormality detecting unit; and
   a device selecting unit that at the time of the start-up of the computer apparatus compares the device information of the external device with the stored device information in the storing unit and excludes the external device from targets of use if the device information of the external device is identical to the stored device information,
   wherein the abnormality detecting unit
      detects the start-up abnormality due to the external device:
         if the device information of the external device and the device information in the storing unit is not identical,
         if there is no response from the external device against a check of connectivity representing whether the external device can perform a normal operation, and
         if a predetermined time passes without the response from the external device, and
      restarts the computer apparatus after the storing of the device information of the external device in the storing unit, when the start-up abnormality is detected; and
   wherein the external device in which the start-up abnormality is detected is excluded from the targets of use by device selecting unit.

2. The computer apparatus of claim 1, wherein the device selecting unit compares the device information of the external device with the device information in the storing unit before performing the check of the connectivity toward the external device.

3. The computer apparatus of claim 1, comprising:
   an input detecting unit that detects operational input, which is given from an outside source by way of a user interface, when the start-up abnormality is detected by the abnormality detecting unit and the notification of the start-up abnormality is performed by the notifying unit, wherein
   whether the device information of the external device, when the start-up abnormality is detected, is stored in the storing unit is selected in accordance with the operational input detected by the input detecting unit.

4. The computer apparatus of claim 1, wherein the external device is a USB (Universal Serial Bus) device.

5. The computer apparatus of claim 1, wherein the storing unit is a nonvolatile memory.

6. A start-up controlling method of a computer apparatus connectable to an external device, the computer apparatus analyzing a function of the external device at a time of start-up to enable use of the external device, the start-up controlling method comprising:
   using a computer processor:
      detecting a start-up abnormality due to the external device at the time of the start-up of the computer apparatus;
      notifying the start-up abnormality when the start-up abnormality is detected;
      storing device information of the external device in a storing unit, when the start-up abnormality is detected; and
      comparing the device information of the external device with the device stored information in the storing unit and excluding the external device from targets of use if the device information of the external device is identical to the stored device information, at the time of the start-up of the computer apparatus;

wherein the detecting of the startup abnormality detects the start-up abnormality due to the external device;
if the device information of the external device and the device information in the storing unit is not identical,
if there is no response from the external device against a check of connectivity representing whether the external device can perform a normal operation, and
if a predetermined time passes without the response from the external device, and
restarts the computer apparatus after the storing of the device information of the external device in the storing unit, when the start-up abnormality is detected; and wherein the comparing of the device information of the external device with the device information in the storing unit excludes the external device, in which the start-up abnormality is detected, from the targets of use.

7. The start-up controlling method of the computer apparatus of claim 6, wherein the comparison of the device information of the external device with the stored device information is performed before performing the check of the connectivity toward the external device.

8. The start-up controlling method of the computer apparatus of claim 6, further comprising:
detecting an operational input, which is given from an outside source by way of a user interface when the start-up abnormality is detected and the notification of the start-up abnormality is performed;
selecting whether to store the device information of the external device, according to the operational input.

9. A computer readable storage medium having embodied therein a start-up controlling program of a computer apparatus connectable to an external device, the computer apparatus analyzing a function of the external device at a time of start-up to enable use of the external device, the program driving the computer apparatus to execute operations comprising:
detecting a start-up abnormality due to the external device at the time of the start-up of the computer apparatus;
notifying the start-up abnormality when the start-up abnormality is detected;
storing the device information of the external device, when the start-up abnormality is detected; and
comparing the device information of the external device with the stored device information in the storing unit and excluding the external device from targets of use if the device information of the external device is identical to the stored device information, at the time of the start-up of the computer apparatus;

wherein the detecting of the start-up abnormality
detects the start-up abnormality due to the external device:
if the device information of the external device and the device information in the storing unit is not identical,
if there is no response from the external device against a check of connectivity representing whether the external device can perform a normal operation, and
if a predetermined time passes without the response from the external device, and
restarts the computer apparatus after the storing of the device information of the external device in the storing unit, when the start-up abnormality is detected; and wherein the comparing of the device information of the external device with the device information in the storing unit excludes the external device, in which the start-up abnormality is detected, from the targets of use.

10. The computer readable storage medium of claim 9, the program driving the computer apparatus to execute: wherein the comparison of the device information of the external device with the stored device information is performed before performing the check of the connectivity toward the external device.

11. The computer readable storage medium of claim 9, the program driving the computer apparatus to execute:
detecting an operational input which is given from an outside source by way of a user interface, when the start-up abnormality is detected and the notification of the start-up abnormality is performed; and
selecting whether to store the device information of the external device, according to the detected operational input.

12. A computer apparatus connectable to an external device, the computer apparatus analyzing a function of the external device at a time of start-up to enable use of the external device, the computer apparatus comprising:
an abnormality detecting unit that detects a start-up abnormality due to the external device;
a storing unit that stores device information representing the external device when the start-up abnormality is detected by the abnormality detecting unit; and
a device selecting unit that compares the device information of the external device with the stored device information in the storing unit at the time of start-up, the device selecting unit excluding the external device from targets of use if the device information of the external device is identical to the stored device information,
wherein the abnormality detecting unit
detects the start-up abnormality due to the external device:
if the device information of the external device and the device information in the storing unit is not identical,
if there is no response from the external device against a check of connectivity representing whether the external device can perform a normal operation, and
if a predetermined time passes without the response from the external device, and
restarts the computer apparatus after the storing of device information of the external device in the storing unit, when the start-up abnormality is detected, and
wherein the external device in which the start-up abnormality is detected is excluded from the targets of use by the device selecting unit.

13. A start-up controlling method of a computer apparatus connectable to an external device, the computer apparatus analyzing a function of the external device at a time of start-up to enable use of the external device, the start-up controlling method comprising:
using a computer processor:
detecting a start-up abnormality due to the external device at the time of the start-up of the computer apparatus;
storing device information of the external device in a storing unit, when the start-up abnormality is detected; and
comparing the device information of the external device with the stored device information in the storing unit at the time of the start-up of the computer apparatus and excluding the external device from targets of use if the device information of the external device is identical to the stored device information, wherein the detecting of the startup abnormality detects the start-up abnormality due to the external device:
- if the device information of the external device and the device information in the storing unit is not identical,
- if there is no response from the external device against a check of connectivity representing whether the external device can perform a normal operation, and
- if a predetermined time passes without the response from the external device, the start-up abnormality due to the external device is detected, and
- restarts the computer apparatus after the storing of the device information of the external device in the storing unit, when the start-up abnormality is detected; and wherein the comparing of the device information of the external device with the device information in the storing unit excludes the external device, in which the start-up abnormality is detected, from the targets of use.

14. A computer readable storage medium having embodied therein a start-up controlling program of a computer apparatus connectable to an external device, the computer apparatus analyzing a function of the external device at a time of start-up to enable use of the external device, the program driving the computer apparatus to execute operations comprising:

detecting a start-up abnormality due to the external device at the time of the start-up of the computer apparatus;

storing device information of the external device when the start-up abnormality is detected; and comparing the device information of the external device with the stored device information in the storing unit at the time of the start-up of the computer apparatus and excluding the external device from targets of use if the device information of the external device is identical to the stored device information, wherein the detecting of the startup abnormality
- detects the start-up abnormality due to the external device:
  - if the device information of the external device and the device information in the storing unit is not identical,
  - if there is no response from the external device against a check of connectivity representing whether the external device can perform a normal operation, and
  - if a predetermined time passes without the response from the external device, and
  - restarts the computer apparatus after the storing of the device information of the external device in the storing unit, when the start-up abnormality is detected; and wherein the comparing of the device information of the external device with the device information in the storing unit excludes the external device, in which the start-up abnormality is detected, from the targets of use.

* * * * *

UNITED STATES PATENT AND TRADEMARK OFFICE
CERTIFICATE OF CORRECTION

PATENT NO. : 7,558,702 B2
APPLICATION NO. : 11/424893
DATED : July 7, 2009
INVENTOR(S) : Naoki Iwasa Page 1 of 1

It is certified that error appears in the above-identified patent and that said Letters Patent is hereby corrected as shown below:

Column 11, Line 6, change "device;" to --device:--.

Signed and Sealed this

Twentieth Day of October, 2009

David J. Kappos
*Director of the United States Patent and Trademark Office*